United States Patent
Li et al.

(10) Patent No.: US 8,179,477 B2
(45) Date of Patent: May 15, 2012

(54) AV PLAYER CHIP, AV SYSTEM, AND RELATED METHOD UTILIZING A MULTIPLEXER FOR SHARING DIGITAL-TO-ANALOG CONVERTERS

(75) Inventors: Sung-Hung Li, Taipei Hsien (TW); Wei-Chih Huang, Taipei (TW)

(73) Assignee: Princeton Technology Corporation, Xindian Dist., New Taipei (TW)

( * ) Notice: Subject to any disclaimer, the term of this patent is extended or adjusted under 35 U.S.C. 154(b) by 1211 days.

(21) Appl. No.: 11/686,932

(22) Filed: Mar. 15, 2007

(65) Prior Publication Data

US 2008/0088742 A1 Apr. 17, 2008

(30) Foreign Application Priority Data

Oct. 11, 2006 (TW) .............................. 95137408 A

(51) Int. Cl.
*H04N 5/44* (2011.01)
(52) U.S. Cl. ........ 348/553; 348/572; 348/557; 348/705; 386/327; 341/144; 345/603; 345/604
(58) Field of Classification Search .................. 345/603, 345/604; 348/572, 557, 705; 386/327; 341/144
See application file for complete search history.

(56) References Cited

U.S. PATENT DOCUMENTS

| | | | | |
|---|---|---|---|---|
| 4,908,697 A * | 3/1990 | Tsinberg et al. | ......... | 375/240.25 |
| 5,574,478 A * | 11/1996 | Bril et al. | ....................... | 345/600 |
| 5,610,661 A * | 3/1997 | Bhatt | ............................ | 348/446 |
| 5,844,629 A * | 12/1998 | Murray et al. | ................ | 348/642 |
| 6,177,946 B1 * | 1/2001 | Sinclair et al. | ................ | 345/501 |
| 6,567,097 B1 * | 5/2003 | Iwaki | ............................ | 345/603 |
| 6,819,305 B2 * | 11/2004 | Wicker | .......................... | 345/3.1 |
| 7,206,025 B2 * | 4/2007 | Choi | ............................ | 348/441 |
| 7,274,361 B2 * | 9/2007 | Chang et al. | .................. | 345/204 |
| 7,598,950 B2 * | 10/2009 | Chang et al. | .................. | 345/204 |
| 2005/0068309 A1 * | 3/2005 | Chang et al. | .................. | 345/204 |
| 2006/0022851 A1 * | 2/2006 | Leung et al. | .................... | 341/51 |
| 2007/0126726 A1 * | 6/2007 | Chang et al. | .................. | 345/204 |

FOREIGN PATENT DOCUMENTS

EP   1 119 208 A2   7/2001

\* cited by examiner

*Primary Examiner* — Jefferey Harold
*Assistant Examiner* — Sam Huang
(74) *Attorney, Agent, or Firm* — Winston Hsu; Scott Margo

(57) ABSTRACT

An AV player chip includes a TV encoder, a timing controller, a multiplexer and a plurality of digital-to-analog converters. The TV encoder is used for transforming a first image signal into a TV video signal. The timing controller is used for generating an output signal. The multiplexer includes a first set of input ends coupled to the TV encoder, a second set of input ends coupled to the timing controller, a control end and a set of output ends. The multiplexer outputs the TV video signal or the output signal to the set of output ends according to a control signal received by the control end. The plurality of digital-to-analog converters are coupled to the set of output ends of the multiplexer for transforming the TV video signal into a first playing signal and for transforming the output signal into a second playing signal.

18 Claims, 4 Drawing Sheets

AV PLAYER CHIP, AV SYSTEM, AND RELATED METHOD UTILIZING A MULTIPLEXER FOR SHARING DIGITAL-TO-ANALOG CONVERTERS

CROSS-REFERENCE TO RELATED APPLICATION

This application claims foreign priority under 35 U.S.C 119(a)-(d), based upon application #095137408 filed in TAIWAN on 2006-Oct.-11.

BACKGROUND OF THE INVENTION

1. Field of the Invention

The present invention relates to an AV player chip and related AV system capable of sharing digital-to-analog converters, and more particularly, to an AV player chip and related AV system utilizing a multiplexer to select a signal format of the output signals.

2. Description of the Prior Art

With speedy development in information and recent advancements in multimedia technology, miscellaneous audio-video apparatuses are used for providing data transmission and sense enjoyment of images and voices. However, as the audio-video technology changes with each passing day, image signals and voice signals with multifarious signal standards come with the tide of fashion. Digital televisions usually support various analog display interfaces, for example, video signals are divided into a composite video broadcast signal (CVBS), a S video signal, a chrominance video signal (Y, Pb, or Pr), etc. TFT LCD monitors usually support image signals such as R, G, and B formats. In order to satisfy with both an externally connected television or a built in TFT LCD monitor for watching images at the same time, an AV player chip usually includes two sets of digital-to-analog converters, whereof one set of digital-to-analog converters is used for outputting an image signal in the composite video format and the S video format (or in the Y, Pb, Pr formats) to the AV terminals of the externally connected television, and the other set of digital-to-analog converters is used for outputting an image signal in the R, G, and B formats to the built in TFT LCD monitor for playing images.

Multimedia electronic products nowadays provide more and more functions due to advancements in multimedia technology and in digital storage technology. Recently, the multimedia electronic products become a large part of people's lives. Due to the multimedia electronic products such as mobile phones, portable media players, digital televisions, and other wireless device becoming mature day by day, the AV player chip of the multimedia electronic products plays a decisive role in order to make these devices possess more diverse functions. Digital-to-analog converters are usually used in the multimedia electronic products such as DVD players, VCD players, portable AV players, digital televisions, and home AV products, and users can transform image signals into an analog format to play images through the digital-to-analog converters.

Please refer to FIG. 1. FIG. 1 is a diagram of an AV player chip 10 according to the prior art. The AV player chip 10 includes a memory 11, an image decoder 12, a scaler 16, a TV encoder 14, a timing controller 18, a first set of digital-to-analog converters 15, and a second set of digital-to-analog converters 17. The first set of digital-to-analog converters 15 includes three digital-to-analog converters DAC1, and the second set of digital-to-analog converters 17 includes three digital-to-analog converters DAC2. The memory 11 is used for storing an image data and can be a static random access memory (SRAM). The image decoder 12 is coupled to an output end of the memory 11 for decoding the image data to generate a first image signal. The scaler 16 is coupled between the image decoder 12 and the timing controller 18 for adjusting the first image signal to generate a second image signal. The TV encoder 14 includes an input end 142 coupled to an output end 122 of the image decoder 12, and three output ends 144, 146, and 148, which are coupled to the three digital-to-analog converters DAC 1 of the first set of digital-to-analog converters 15 individually. The TV encoder 14 is used for transforming the first image signal into a TV video signal set. The three digital-to-analog converters DAC 1 of the first set of digital-to-analog converters 15 are used for transforming the TV video signal set outputted by the TV encoder 14 into the analog format and outputting a CVBS signal, a Y signal, and a C signal individually. The timing controller 18 includes an input end 182 coupled to an output end 162 of the scaler 16 for receiving the second image signal, and three output ends 184, 186, and 188, which are coupled to the three digital-to-analog converters DAC2 of the second set of digital-to-analog converters 17 individually. The timing controller 18 is used for generating a corresponding output signal set according to the second image signal. The three digital-to-analog converters DAC2 of the second set of digital-to-analog converters 17 are used for transforming the output signal set outputted by the timing controller 18 into the analog format and outputting a R signal, a G signal, and a B signal individually. The image decoder 12 can be an MPEG 2 decoder.

In the prior art, an AV player chip usually includes two sets of digital-to-analog converters, whereof one set of digital-to-analog converters is used for outputting an image signal in the composite video format and the S video format (or in the Y, Pb, Pr formats) to the AV terminals of the externally connected television, and the other set of digital-to-analog converters is used for outputting an image signal in the R, G, and B formats to the built in TFT LCD monitor for playing images directly. The above-mentioned method of utilizing two sets of digital-to-analog converters to transform signals is not economical. Besides, the digital-to-analog converter occupies quite large areas and wastes cost itself. As a result, chip sizes and manufacturing costs will be raised substantially.

SUMMARY OF THE INVENTION

The claimed invention provides an AV player chip capable of sharing digital-to-analog converters. The AV player chip includes a TV encoder, a timing controller, a multiplexer, and a plurality of digital-to-analog converters. The TV encoder is used for transforming a first image signal into a TV video signal. The timing controller is used for receiving a second image signal and generating an output signal. The multiplexer is coupled to the TV encoder for receiving the TV video signal and coupled to the timing controller for receiving the output signal. The multiplexer is used for outputting the TV video signal or the output signal selectively according to a control signal. The multiplexer has a first set of input ends, a second set of input ends, a control end, and a set of output ends. The plurality of digital-to-analog converters are coupled to the multiplexer for transforming the TV video signal into a first playing signal and for transforming the output signal into a second playing signal.

The claimed invention provides an AV system capable of sharing digital-to-analog converters. The AV system includes an AV control device, an AV player chip, and a display device. The AV control device is used for providing an image data. The AV player chip coupled to the AV control device. The AV player chip includes a TV encoder, a timing controller, a multiplexer, and a plurality of digital-to-analog converters. The TV encoder is used for transforming a first image signal into a TV video signal. The timing controller is used for receiving a second image signal and generating an output signal. The multiplexer is coupled to the TV encoder for receiving the TV video signal and coupled to the timing controller for receiving the output signal. The multiplexer is used for outputting the TV video signal or the output signal selectively according to a control signal. The multiplexer has a first set of input ends, a second set of input ends, a control end, and a set of output ends. The plurality of digital-to-analog converters are coupled to the multiplexer for transforming the TV video signal into a first playing signal and for transforming the output signal into a second playing signal. The display device is coupled to the plurality of digital-to-analog converters for displaying the first playing signal or the second playing signal in the analog format. The AV control device is a digital versatile disc player (DVD player), a digital versatile disc decoder (DVD decoder), or a digital television. The display device is a television monitor or a TFT LCD.

The claimed invention provides an AV playing method capable of sharing digital-to-analog converters of an AV player chip. The AV playing method includes utilizing a TV encoder to transform a first image signal into a TV video signal, utilizing a timing controller to generate a corresponding output signal according to a second image signal, selecting to output the TV video signal or the output signal, and transforming the TV video signal into a first playing signal in an analog format and transforming the output signal into a second playing signal in the analog format. The method further includes displaying the first playing signal in the analog format, and displaying the second playing signal in the analog format.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
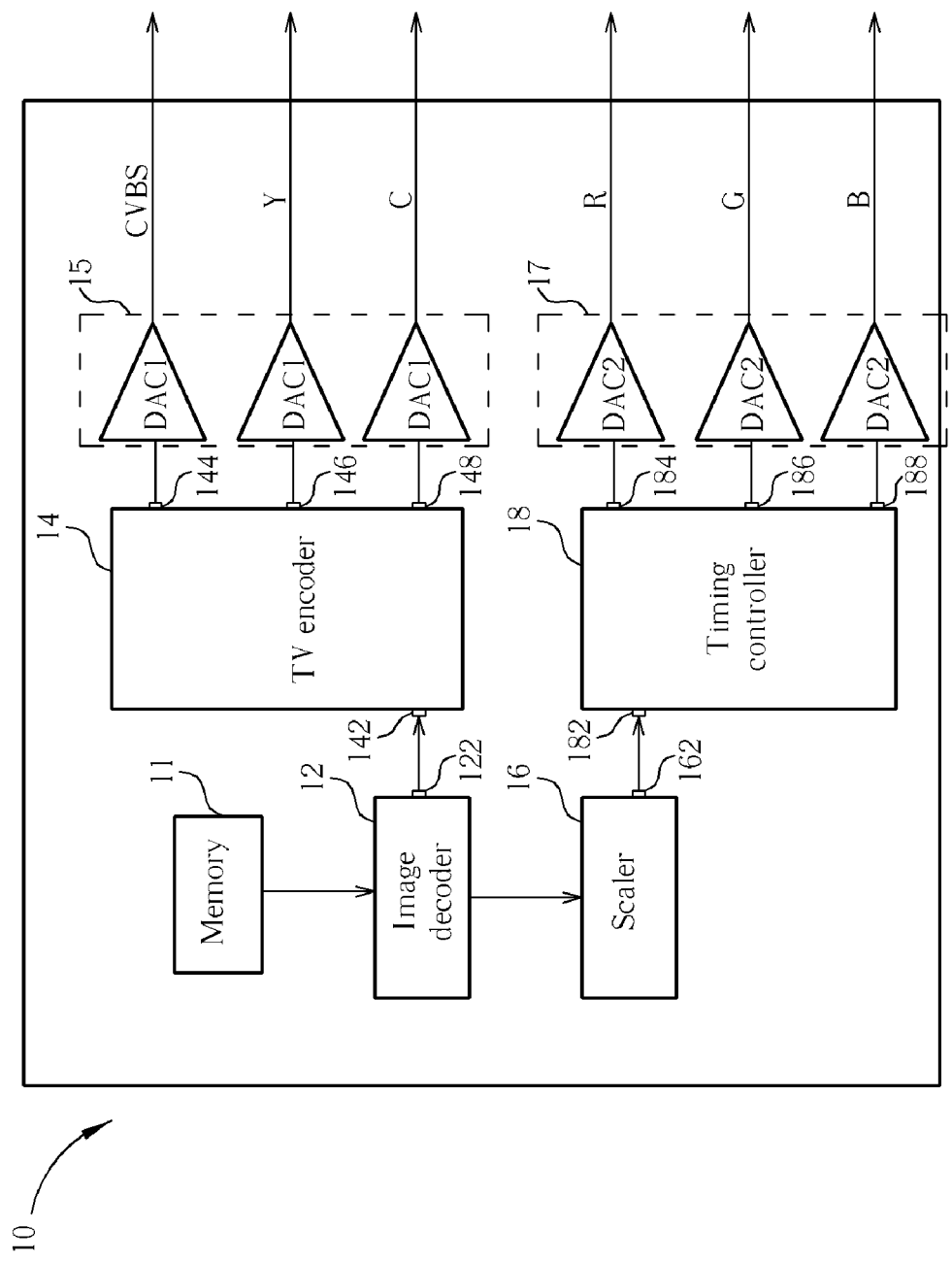
FIG. 1 is a diagram of an AV player chip according to the prior art.
Figure 2:
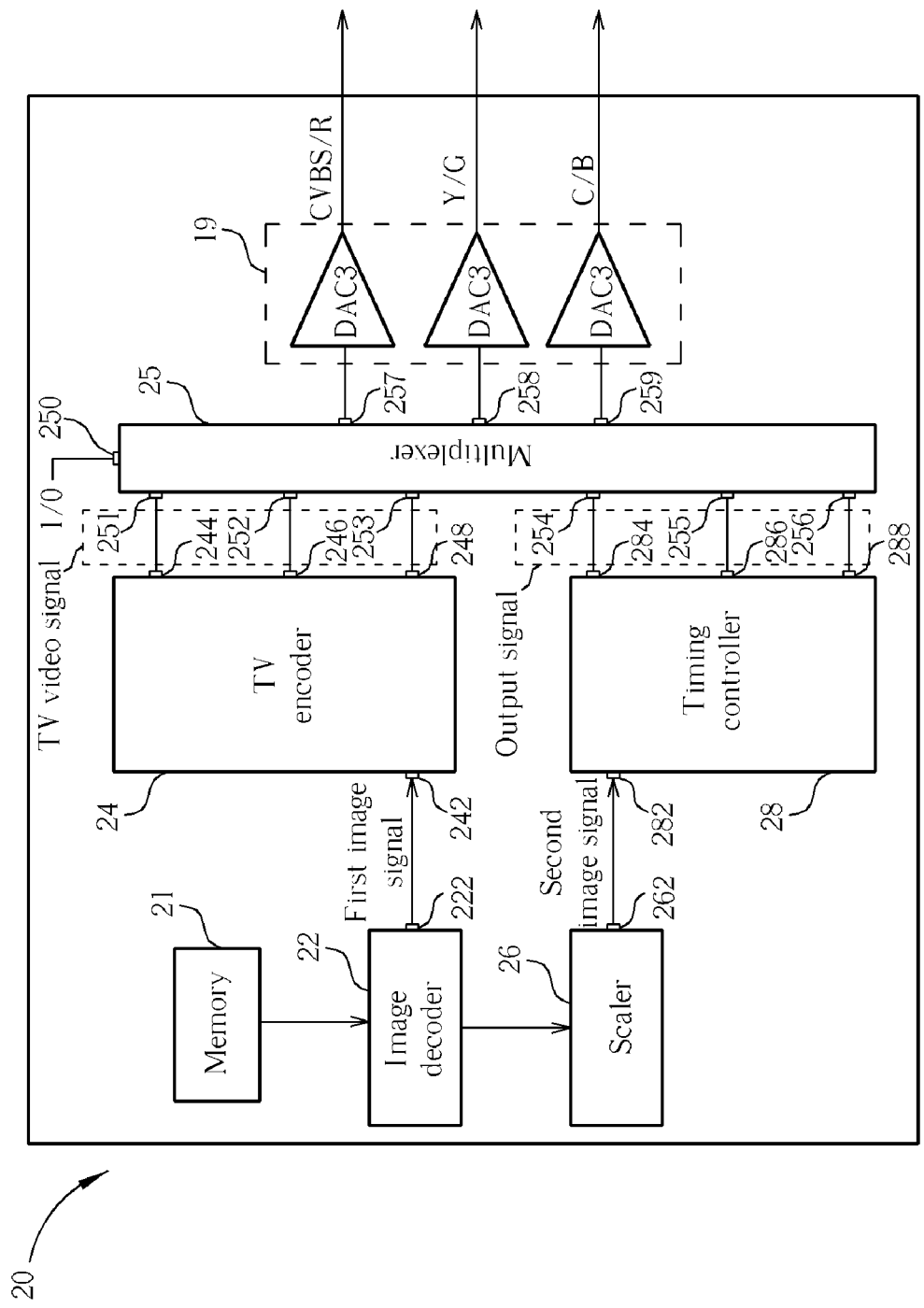
FIG. 2 is a diagram of an AV player chip according to an embodiment of the present invention.

Please refer to FIG. 2, which is a diagram of an AV player chip 20 according to an embodiment of the present invention. The AV player chip 20 includes a memory 21, an image decoder 22, a scaler 26, a TV encoder 24, a timing controller 28, a multiplexer 25, and a set of digital-to-analog converters 19. The set of digital-to-analog converters 19 includes three digital-to-analog converters DAC3. The memory 21 is used for storing an image data and can be a static random access memory (SRAM). The image decoder 22 is coupled to an output end of the memory 21 for decoding the image data to generate a first image signal. The scaler 26 is coupled between the image decoder 22 and the timing controller 28 for adjusting the first image signal to generate a second image signal.

The multiplexer 25 includes six input ends 251-256, three output ends 257-259, and a control end 250. The TV encoder 24 includes an input end 242 coupled to an output end 222 of the image decoder 22 for receiving the first image signal. The TV encoder 24 includes three output ends 244, 246, and 248, which are coupled to three input ends 251, 251, and 253 of the multiplexer 25 individually. The TV encoder 24 is used for transforming the first image signal into a TV video signal set. The timing controller 28 includes an input end 282 coupled to an output end 262 of the scaler 26 for receiving the second image signal. The timing controller 28 includes three output ends 284, 286, and 288 that are coupled to the three output ends 254, 255, and 256 of the multiplexer 25 individually. The timing controller 28 is used for generating a corresponding output signal set according to the second image signal. The three digital-to-analog converters DAC3 of the set of digital-to-analog converters 19 are used for transforming the TV video signal set into an analog format and outputting a first playing signal in a CVBS format, a Y format, and a C format individually when the multiplexer 25 selects to output the TV video signal set outputted by the TV encoder 24 through a control signal of the control end 250. On the other hand, the three digital-to-analog converters DAC3 of the set of digital-to-analog converters 19 are used for transforming the output signal set into an analog format and outputting a second playing signal in a R format, a G format, and a B format individually when the multiplexer 25 selects to output the output signal set outputted by the timing controller 28 through the control signal of the control end 250. The image decoder 22 can be a MPEG2 decoder (Moving Picture Coding Experts Group 2 Decoder).

Figure 3:
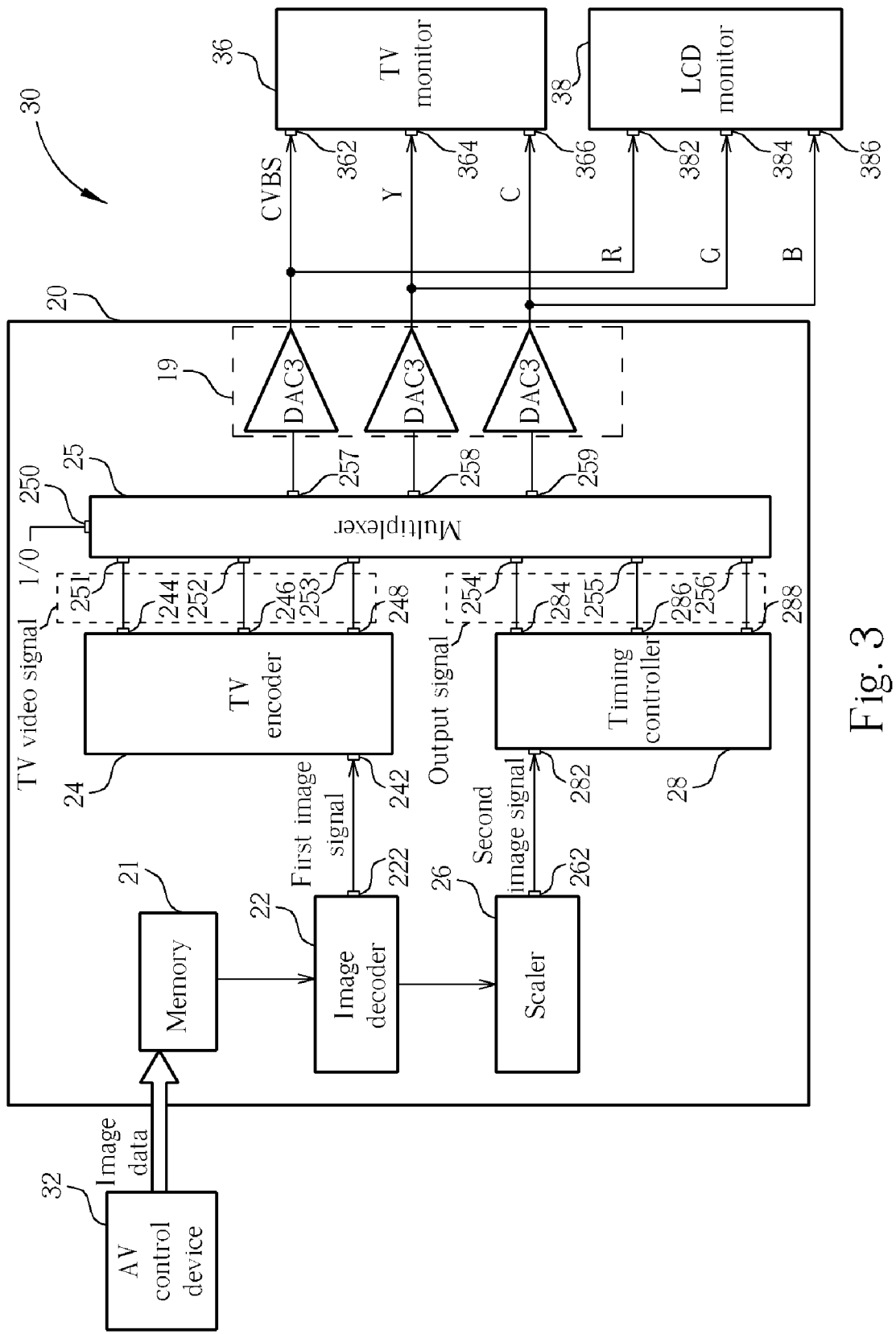
FIG. 3 is a diagram of an AV system according to an embodiment of the present invention.

Please refer to FIG. 3, which is a diagram of an AV system 30 according to an embodiment of the present invention. The AV system 30 includes an AV control device 32, an AV player chip 20, a TV monitor 36, and a LCD monitor 38. In one embodiment, the AV control device 32 can be a digital television, a portable DVD player, or a DVD decoder. The Please refer to FIG. 3, which is a diagram of an AV system 30 according to an embodiment of the present invention. The AV system 30 includes an AV control device 32, an AV player chip 20, a TV monitor 36, and a LCD monitor 38. In one embodiment, the AV control device 32 can be a digital television, a portable DVD player, or a DVD decoder. The AV control device 32 is used for providing a source of an image data. The AV player chip 20 is coupled to the AV control device 32 for receiving the image data. The elements and the connection manners of the AV player chip 20 in FIG. 3 are the same as the AV player chip 20 shown in FIG. 2 and are not described further. The TV monitor 36 includes three input ends 362, 364, and 366, which are coupled to the three digital-to-analog converters DAC3 of the set of digital-to-analog converters 19 individually. The three digital-to-analog converters DAC3 of the set of digital-to-analog converters 19 are used for transforming the TV video signal set into an analog format and outputting the first playing signal in the CVBS format, the Y format, and the C format to the three input ends 362, 364, and 366 of the TV monitor 36 individually when the multiplexer 25 selects to output the TV video signal set outputted by the TV encoder 24 through a control signal of the control end 250. The TV monitor 36 is used for playing the first playing signal, whereof the threes input ends 362, 364, and 366 are common AV terminals. The LCD monitor 38 includes three input ends 382, 384, and 386, which are coupled to the three digital-to-analog converters DAC3 of the set of digital-to-analog converters 19 individually. The three digital-to-analog converters DAC3 of the set of digital-to-analog converters 19 are used for transforming the output signal set into the analog format and outputting the second playing signals in a R format, a G format, and a B format individually to the three input ends 382, 384, and 386 of the LCD monitor 38 individually when the multiplexer 25 selects to output the output signal set outputted by the timing controller 28 through the control signal of the control end 250. Therefore, the LCD monitor 38 is used for playing the second playing signal. The LCD monitor 38 can be a TFT LCD built in the AV control device 32.

Figure 4:
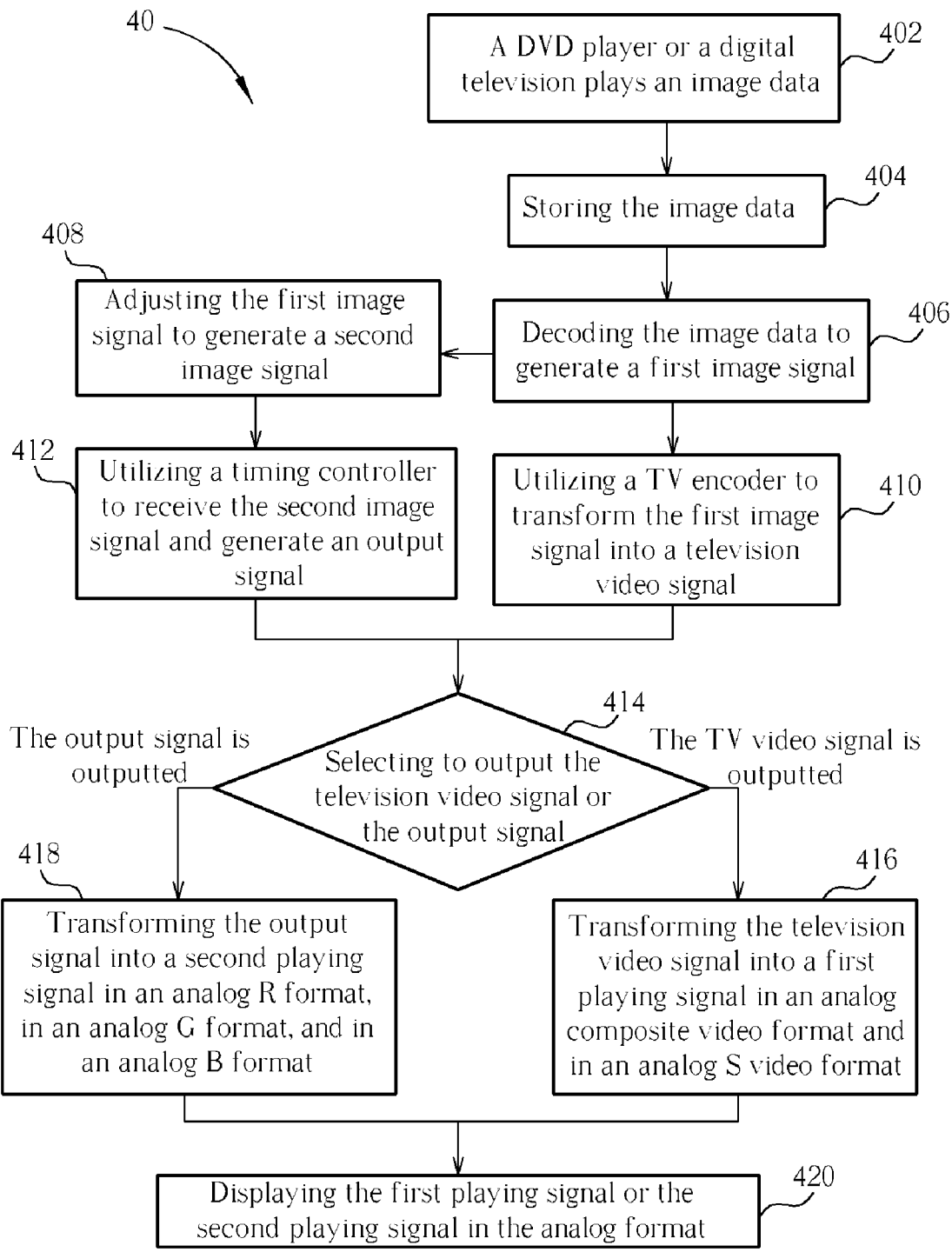
FIG. 4 is a diagram of a flow illustrating an AV playing method capable of sharing digital-to-analog converters according to an embodiment of the present invention.

Please refer to FIG. 4. FIG. 4 is a diagram of a flow 40 illustrating an AV playing method capable of sharing digital-to-analog converters according to an embodiment of the present invention. The flow 40 includes the following steps:

Step 402: Utilizing a DVD player or a digital television to play an image data.

Step 404: Storing the image data.

Step 406: Decoding the image data to generate a first image signal.

Step 408: Adjusting the first image signal to generate a second image signal.

Step 410: Utilizing a TV encoder to transform the first image signal into a television video signal.

Step 412: Utilizing a timing controller to generate a corresponding output signal according to the second image signal.

Step 414: Selecting to output the television video signal or the output signal.

Step 416: Transforming the television video signal into a first playing signal in an analog composite video format and in an analog S video format when the television video signal is selected to output.

Step 418: Transforming the output signal into a second playing signal in an analog R format, in an analog G format, and in an analog B format when the output signal is selected to output.

Step 420: Displaying the first playing signal or the second playing signal in the analog format.

In step 406, an image decoder is used for decoding the image data to generate the first image signal. In step 408, the first image signal is adjusted to generate the second image signal through a scaler. In step 410, the TV encoder is utilized to transform the first image signal into the television video signal, whereof the television video signal can be a CVBS signal, an S video signal, and chrominance video signals (such as Y, Pb, Pr), etc. In step 412, the output signal can be image signals in the R, G, and B format. The television video signal or the output signal is selected to output through step 414, and then the same set of digital-to-analog converters can be utilized to transform the television video signal into the first playing signal in the analog composite video format and in the analog S video format or to transform the output signal into the second playing signal in the analog R format, the analog G format, and the analog B format in step 416 and step 418. Finally, the first playing signal and the second playing signal are played through different paths, that is playing the first signal by transmitting it to a television through the AV terminals of the television, or playing the second signal by transmitting it to a built in LCD monitor.

The abovementioned embodiments are presented merely for describing the present invention, and in no way should be considered to be limitations of the scope of the present invention. The image decoder 22 is not limited to being an MPEG 2 decoder only and can be other image decoders. The three digital-to-analog converters DAC3 of the set of digital-to-analog converters 19 can not only be used for outputting the first playing signal in the CVBS format, the Y format, and the C format individually for the AV terminals of the television but also can be used for outputting the first playing signal in the Y format, the Pb format, the Pr format, or other formats individually when the multiplexer 25 selects to output the TV video signal set outputted by the TV encoder 24 through a control signal of the control end 250. Furthermore, the display device can be externally connected monitors or built in monitors, such as a television monitor, a TFT LCD monitor, or other monitors.

From the above descriptions, the present invention provides an AV player chip and an AV system capable of sharing digital-to-analog converters. The multiplexer 25 is added into the AV player chip 20, and the same set of digital-to-analog converters is shared by both the externally connected television and the built in monitor through the choice of the multiplexer 25. As a result, not only can the first playing signal (in the composite video format and the S video format or in the Y, Pb, Pr format) be transmitted to the AV terminals of the television, but also the second playing signal (in the R, G, B format) can be transmitted to the built in TFT LCD monitor. Therefore, one set of digital-to-analog converters can be omitted to save chip areas and cost. Furthermore, the power consumption of the set of digital-to-analog converters is decreased, which is quite important in portable media players.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An AV player chip capable of sharing digital-to-analog converters comprising:
    a TV encoder used for transforming a first image signal into a TV video signal;
    a timing controller used for receiving a second image signal and generating an output signal;
    a single multiplexer, comprising:
        a first set of input ends coupled to the TV encoder for receiving the TV video signal;
        a second set of input ends coupled to the timing controller for receiving the output signal;
        a control end used for receiving a single control signal used to control the operation of the single multiplexer; and
        a set of output ends for outputting the TV video signal or the output signal selectively according to the single control signal; and
    a plurality of digital-to-analog converters coupled to the single multiplexer for transforming the TV video signal into a first playing signal and for transforming the output signal into a second playing signal.

2. The AV player chip of claim 1 further comprising an image decoder coupled to the TV encoder for decoding an image data to generate the first image signal.

3. The AV player chip of claim 2 wherein the image decoder is a MPEG2 (Moving Picture Coding Experts Group 2) decoder.

4. The AV player chip of claim 2 further comprising:
    a scaler coupled between the image decoder and the timing controller for adjusting the first image signal to generate the second image signal; and
    a memory coupled to the image decoder for storing the image data desiring to be decoded by the image decoder.

5. The AV player chip of claim 4 wherein the memory is a static random access memory (SRAM).

6. The AV player chip of claim 1 wherein the plurality of digital-to-analog converters comprises three digital-to-analog converters coupled to a R connection port, a G connection port, and a B connection port individually for outputting the second playing signal in a R format, a G format, and a B format.

7. The AV player chip of claim 1 wherein the plurality of digital-to-analog converters comprises three digital-to-analog converters coupled to a composite video terminal connection port and two S video terminal connection ports for outputting the first playing signal in a composite video format and a S video format.

8. The AV player chip of claim 1 wherein the plurality of digital-to-analog converters comprises three digital-to-analog converters coupled to a Y connection port, a Pb connection port, and a Pr connection port for outputting the first playing signal in a Y format, a Pb format, and a Pr format.

9. An AV system capable of sharing digital-to-analog converters comprising:
an AV control device used for providing an image data;
an AV player chip coupled to the AV control device, the AV player chip comprising:
 a TV encoder used for transforming a first image signal into a TV video signal;
 a timing controller used for receiving a second image signal and generating an output signal;
 a single multiplexer, comprising:
  a first set of input ends coupled to the TV encoder for receiving the TV video signal;
  a second set of input ends coupled to the timing controller for receiving the output signal;
  a control end used for receiving a single control signal used to control the operation of the single multiplexer; and
  a set of output ends for outputting the TV video signal or the output signal selectively according to the single control signal; and
 a plurality of digital-to-analog converters coupled to the single multiplexer for transforming the TV video signal into a first playing signal and for transforming the output signal into a second playing signal; and
a display device coupled to the plurality of digital-to-analog converters for displaying the first playing signal or the second playing signal in the analog format.

10. The AV system of claim 9 wherein the AV player chip further comprises an image decoder coupled to the TV encoder for decoding an image data to generate the first image signal.

11. The AV system of claim 10 wherein the image decoder is a MPEG2 (Moving Picture Coding Experts Group 2) decoder.

12. The AV system of claim 9 wherein the AV player chip further comprises:
a scaler coupled between the image decoder and the timing controller for adjusting the first image signal to generate the second image signal; and
a memory coupled to the image decoder for storing the image data desiring to be decoded by the image decoder.

13. The AV system of claim 12 wherein the memory is a static random access memory (SRAM).

14. The AV system of claim 9 wherein the plurality of digital-to-analog converters comprises three digital-to-analog converters coupled to a R connection port, a G connection port, and a B connection port individually for outputting the second playing signal in a R format, a G format, and a B format.

15. The AV system of claim 9 wherein the plurality of digital-to-analog converters comprises three digital-to-analog converters coupled to a composite video terminal connection port and two S video terminal connection ports for outputting the first playing signal in a composite video format and a S video format.

16. The AV system of claim 9 wherein the plurality of digital-to-analog converters comprises three digital-to-analog converters coupled to a Y connection port, a Pb connection port, and a Pr connection port for outputting the first playing signal in a Y format, a Pb format, and a Pr format.

17. The AV system of claim 9 wherein the AV control device is a digital versatile disc player (DVD player), a digital versatile disc decoder (DVD decoder), or a digital television.

18. The AV system of claim 9 wherein the display device is a television monitor or a TFT LCD.

* * * * *